(12) United States Patent
Blankenship

(10) Patent No.: US 6,331,694 B1
(45) Date of Patent: Dec. 18, 2001

(54) FUEL CELL OPERATED WELDER

(75) Inventor: George D. Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/457,156

(22) Filed: Dec. 8, 1999

(51) Int. Cl.[7] .................................................. B23K 9/10
(52) U.S. Cl. .................. 219/137 PS; 219/74; 219/130.1; 429/13
(58) Field of Search ............................ 219/130.1, 130.31, 219/130.32, 130.33, 130.5, 130.51, 137 PS, 74; 320/111; 429/22, 33, 37, 13

(56) References Cited

U.S. PATENT DOCUMENTS

| | | |
|---|---|---|
| 4,861,965 | 8/1989 | Stava . |
| 4,972,064 | 11/1990 | Stava . |
| 5,148,001 | 9/1992 | Stava . |
| 5,599,638 | 2/1997 | Surampudi et al. . |
| 5,656,388 | 8/1997 | Bugga et al. . |
| 5,672,438 | 9/1997 | Banerjee et al. . |
| 5,766,787 | 6/1998 | Watanabe et al. . |
| 5,773,162 | 6/1998 | Surampudi et al. . |
| 5,795,496 | 8/1998 | Yen et al. . |
| 5,888,665 | 3/1999 | Bugga et al. . |
| 5,904,740 | 5/1999 | Davis . |
| 5,919,583 | 7/1999 | Grot et al. . |
| 5,928,806 | 7/1999 | Olah et al. . |
| 5,945,231 | 9/1999 | Narayanan et al. . |
| 5,958,616 | 9/1999 | Salinas et al. . |
| 5,961,863 | 10/1999 | Stava . |
| 5,981,095 | 11/1999 | Leddy et al. . |
| 5,981,097 | 11/1999 | Rajendran . |
| 5,992,008 | 11/1999 | Kindler . |

FOREIGN PATENT DOCUMENTS

| | | |
|---|---|---|
| WO98/22989 | 5/1998 | (WO) . |
| WO98/45694 | 10/1998 | (WO) . |
| WO99/16137 | 4/1999 | (WO) . |
| WO99/39841 | 8/1999 | (WO) . |

*Primary Examiner*—Clifford C. Shaw
(74) *Attorney, Agent, or Firm*—Vickers, Daniels & Young

(57) ABSTRACT

An electric arc welder powered by a plurality of liquid organic fuel cells. The fuel cells use a methanol/water mixture as the organic feed. The fuel cells produce carbon dioxide as a reactive product which is used an a shielding gas during the arc welding process. The fuel cells are stacked together to produce the desired arc voltage and current between an electrode and the workpiece. The arc welder includes a welding current to control the current wave shape through the electrode and to control or increase the voltage through the electrode.

48 Claims, 8 Drawing Sheets

FUEL CELL OPERATED WELDER

The invention relates to the art of welding with an electric arc and more particularly to an arc welder that is powered by a fuel efficient and portable power source, and even more particularly to an arc welder that is at least partially powered by a fuel cell.

INCORPORATION BY REFERENCE

The present invention incorporates the use of fuel cells of the general type described in United States Letters Patent Nos. 5,599,638; 5,656,388; 5,773,162; 5,795,496; 5,888,665; and 5,928,806; and PCT Patent Application Nos. WO 98/22989; WO 98/45694; WO 99/16137; and WO 99/39841. These patents and patent applications are also incorporated herein to describe the manufacture of the fuel cell components and operation of such fuel cells. United States Letters Pat. Nos. 4,861,965; 4,972,064; 5,148,001; and 5,961,863 are also incorporated herein to describe a few of the welders that can be used with a fuel cell.

BACKGROUND OF THE INVENTION

This invention relates to the field of arc welding, and more particularly to an improved arc welder that incorporates a fuel cell as an at least partial source of power for the arc welder.

Arc welders are typically powered by plugging the arc welding into an electrical outlet or having the arc welder equipped with a gas powered electric generator. Arc welders that are designed to receive power from an electric outlet are limited to use in a location that has an electric outlet which is rated to supply the needed current for operation of the arc welder. Operators of such arc welders need extension cords to increase the mobility of such arc welders. When the arc welder is used in a remote location or in a location that is not readily accessible to a power outlet or a power outlet having a needed current rating, the arc welder must be equipped with its own power source, such as a gas electric generator, to supply the required current to the arc welder. The gas generator is typically designed to be powered by a standard petroleum fuel source such as gasoline. In many operational environments, these two power source arrangements for arc welders are sufficient to satisfy the power demands of the arc welder.

Arc welders that are used in remote locations that are partially or totally enclosed or are not well ventilated may require special equipment during the welding operation. In such locations, a gas powered electric generator is used to supply power to the arc welder. During the operation of the gas powered generator, exhaust fumes are produced which can be unhealthy if breathed in sufficient concentrations. In additional, the gas powered generator produces noise during operation. Such noise could cause temporary hearing loss when operating the arc welder in a small enclosed environment for long periods of time. In addition to these operator health concerns, the operation of the gas powered electric generator produces pollutants which can be harmful and/or adversely affect the environment. These pollutants include noise pollution and combustion products from the combustion of fuel by the gas powered generator. Pollution concerns also exist for electric powered arc welders since the electricity is typically generated by coal burning generators and atomic power plants, both of which create their own environmental hazards. In addition to the pollution concerns of the energy sources, the cost of the energy continues to rise. As oil supplies and coal supplies continue to deplete worldwide, the cost of gasoline and electricity generated by coal burning generators will continue their unabated rise in cost. Rising energy costs generally slow or stunt growth in the industrial sectors.

Although these problems have existed for some time, there has heretofore been no viable alternative to gas powered electric generators for arc welders or arc welders powered by an electric outlet source. Battery powered arc welders are very bulky and have a limited life. Furthermore, once the battery has been discharged, the battery must be disposed of which is in-of-itself an environmental concern. In addition, many batteries require concentrated acids which can be harmful if such acid fumes are breathed in or if the acid contacts human skin. The acid is also an environmental pollutant requiring special and costly disposal. Solar power is another power source which is not feasible for use with an electric arc welder. The size of the solar panels necessary to generate the required amount of power are too large to use, especially in small environments. Furthermore, the solar panels require sunlight, thus on cloudy days or in enclosed environments, the solar battery will not produce the needed electric power. Solar power panels are also very expensive thereby making them cost prohibitive for use with arc welders. Wind powered generators are also not feasible due to their bulky construction and need for a consistent wind source. The bulkiness of batteries, solar panels, and wind powered generators compound the size problems of the arc welder. The electric circuitry in the welder is limited to a certain size by the power demands of the arc welder. Arc welders which require shielding gas must include bulky canisters to supply the shielding gas. The combination of bulky shielding gas canisters with a bulky power source would make the arc welder unwieldy for use in many environments.

In view of the problems associated with alternative power sources for electric arc welders, there is a need for an improved power source that is environmentally friendly, can be safely use in a wide variety of locations, and is simple and safe to operate.

SUMMARY OF THE INVENTION

The present invention relates to a method and apparatus of arc welding together metal plates, and more particularly a method and apparatus for arc welding that incorporate a fuel cell as an energy source to totally or partially power the arc welder.

In accordance with the preferred embodiment of the present invention, there is provided a fuel cell power supply with a positive and negative terminal, a welding current circuit which applies a welding current across a welding electrode and a workpiece. The fuel cell is an electrochemical cell in which a free energy change resulting from a fuel oxidation reaction is converted into electrical energy. In one embodiment, an organic/air fuel cell is used to oxidize an organic fuel to carbon dioxide at an anode while air or oxygen is reduced to water at a cathode. Fuel cells employing organic fuels are extremely attractive because of the high specific energy of the organic fuels. In another embodiment, the fuel cell is an "indirect" or "reformer" fuel cell or a "direct oxidation" fuel cell. In an indirect fuel cell, the fuel is catalytically reformed and processed. For organic fuels, the fuel is catalytically reformed and processed into carbon monoxide-free hydrogen, with the hydrogen so obtained oxidized at the anode of the fuel cell. In a direct oxidation fuel cell, the fuel is directly fed into the fuel cell without any previous chemical modification where the fuel is oxidized at the anode. Direct oxidation fuel cells do not require a fuel processing stage. As a result, direct oxidation fuel cells are generally less complicated and are smaller in size than indirect fuel cells.

In accordance with another aspect of the present invention, the fuel cell includes high-surface-area electro-catalytic anodes and/or cathodes. In one embodiment, the fuel cell anode and/or cathode fabrication includes a high surface-area carbon-supported metal powder. In one aspect of this embodiment, alloy powder combined with a TEFLON binder is applied to a carbon fiber-based support to yield a gas diffusion anode and/or cathode. In another embodiment, the anode and/or cathode is used for gas and/or liquid feeds. In still another embodiment, the anode and/or cathode is very porous to allow for proper wetting of the pores.

In accordance with still another embodiment of the present invention, the anode and/or cathode of the fuel cell is coated by a substance that improves the wetting properties of the electrode. In accordance with this specific aspect of the invention, a compound including perfluorinated sulfonic acid is coated on the anode and/or cathode to increase the wetting properties of the anode and/or cathode. The coating decreases the interfacial tension of the liquid/catalyst interface and leads to a more uniform wetting of the anode and/or cathode pores and particles by the liquid fuel solution, yielding enhanced utilization of the electrocatalyst. The coating can also provide ionic continuity with the solid electrolyte membrane and permit efficient transport of protons or hydronium ions generated by the fuel oxidation reaction. The coating may further facilitate in the release of carbon dioxide from the pores of the anode and/or cathode. By using a perfluorinated sulfonic acid, anionic groups are not strongly adsorbed on the anode and/or cathode/electrolyte interface. Consequently, the kinetics of electro-oxidation of methanol are more facile than in sulfuric acid electrolyte. Other hydrophilic proton-conducting additives with the desired properties which can be alternatively used or used in combination with perfluorinated sulfonic acid include montmorrolinite clay, alkoxycelluloses, cyclodextrins, mixtures of zeolites, and/or zirconium hydrogen phosphate.

In accordance with another aspect of the present invention, a liquid fuel is used in the fuel cell. In one embodiment, the liquid fuel undergoes clean and efficient electro-chemical oxidation within the fuel cell. For direct oxidation fuel cells, the efficient utilization of organic fuels is governed by the ease by which the organic compounds are anodically oxidized within the fuel cell. In one embodiment, the organic fuel includes methanol, formaldehyde, formic acid, trimethoxymethane, dimethoxymethane and/or trioxane.

In accordance with yet another aspect of the present invention, the fuel cell is a direct type liquid feed fuel cell which does not require an acid electrolyte. In one embodiment, a solid polymer electrolyte membrane is used to eliminate the need for the acid electrolyte. In another embodiment, the solid polymer electrolyte membrane is used in combination with a battery-type anode that is porous and is capable of wetting the fuel. In still another embodiment, a battery-type anode structure and a cathode are bonded to either side of the solid polymer electrolyte membrane. A solution of an organic feed which is substantially free of acid is circulated past the anode side of the assembly. The solid polymer membrane is formulated to have excellent electrochemical and mechanical stability, high ionic conductivity, and functions both as an electrolyte and as a separator. Furthermore, when using an organic feed such an methanol, the kinetics of electro-oxidation of the organic feed and electro-reduction of air or oxygen are more facile at an anode and/or cathode/membrane-electrolyte interface as compared to an anode and/or cathode/sulfuric acid interface. In a further embodiment, the solid polymer electrolyte is a proton-conducting cation-exchange membrane. In one specific aspect of this embodiment, the membrane includes tetrafluoroethylene, perflourinated sulfonic acid polymer, a polystyrene sulfonic acid, a poly (vinylidene fluoride), a polyhydrocarbon sulfonic acid, and/or a co-polymer of tetrafluoroethylene and perfluorovinylether sulfonic acid. In another specific aspect of the embodiment, membranes of modified perflourinated sulfonic acid polymer, polyhydrocarbon sulfonic acid, polyhydrocarbon sulfonic acid which can be used includes, but are not limited to, a sulfonated polyether ether ketone, and/or a poly (phenylene ether sulfone). In another embodiment, the exchange membrane is a composite of two or more different kinds of proton exchange membranes. In still another embodiment, the membrane permits operation of the fuel cell at temperatures at least up to 120° C. In still yet another embodiment, the fuel cell is substantially free of expensive corrosion-resistant components in the fuel cell due to the absent of an acidic electrolyte. In still another embodiment, the membrane thickness is about 0.05–1 mm.

In accordance with a further aspect of the present invention, the anode of the fuel cell is formed from high surface area particles of platinum-based alloys of noble and non-noble metals. In one embodiment, binary and ternary compositions can be used for the electro-oxidation of organic fuels. In another embodiment, platinum alloy, with compositions varying from 10–90 percent platinum, makes up the anode. In one specific aspect of this embodiment, the platinum alloy includes ruthenium, tin, iridium, osmium, and/or rhenium. In yet another embodiment, all or part of the platinum in the platinum alloy is substituted for palladium, tungsten, rhodium, iron, cobalt, titanium, iridium, chromium, manganese, molybdenum, niobium, zirconium, osmium, titanium oxide and/or nickel. In still another embodiment, the platinum alloy particles are in the form of fine metal powders, i.e., "unsupported", and/or are supported on high surface area material. In one specific aspect, the high surface area material includes a carbon material. In another embodiment, the platinum alloy is loaded in the electrocatalyst layer in the range of about 0.05–4.0 mg/cm$^2$. In still another embodiment, particles of titanium oxide, iridium and/or osmium are added to the platinum alloy to improve fuel cell performance. In yet another embodiment, the average particle size of the particles on the anode is about 0.5–8 microns.

In accordance with a yet a further aspect of the present invention, the cathode of the fuel cell is formed from particles which include platinum, supported and/or unsupported, to the proton permeable membrane. In one embodiment, the platinum particles are supported on a carbon containing material. In another embodiment, the cathode includes a material to increase the hydrophobicity of the cathode. In one aspect of this embodiment, the material to increase the hydrophobicity includes tetrafluoroethylene. In another embodiment, the platinum particles are loaded in the electrocatalyst layer in the range of about 0.05–4.0 mg/cm$^2$. In still another embodiment, the average particle size of the particles on the cathode is about 0.5–8 microns.

In accordance with another aspect of the present invention, the fuel cell is a regenerative fuel cell. In one embodiment, the fuel cell reduces carbon dioxide to an oxygenated hydrocarbon and oxygen. In another embodiment, the oxygenated hydrocarbons include methyl alcohol, methyl formate, formaldehyde and/or formic acid.

In accordance with yet another aspect of the present invention, a plurality of fuel cells are stacked together to increase the voltage and/or current generated by the fuel cells. In one embodiment, a plurality of fuel cells are connected together in parallel. In another embodiment, a plurality of fuel cells are connected together in series.

In accordance with still yet another aspect of the present invention, one or more of the products of the fuel cell are at least partially used as a shielding gas for the arc welder. In one embodiment, the shielding gas produced from the fuel cell includes carbon dioxide and/or carbon monoxide. In another embodiment, a dehumidifier, condenser and/or scrubber are used to remove undesired gases and/or liquids from the product gas prior to directing the product gas to the welding pool. In still another embodiment, a shielding gas controller is used to regulate the amount of shielding gas directed to the workpiece and/or to control the pressure of the shielding gas to the workpiece.

In accordance with another aspect of the present invention, the welding electrode is a consumable electrode. In one embodiment, the consumable electrode is a flux cored electrode that includes a flux system within the cored electrode to provides a shielding gas and/or a desired slag during the welding process. In one aspect of this embodiment, the consumable cored electrode includes alloy metals in the core so as to obtain a weld bead composition which is substantially similar to the composition of the workpieces being welded together. A weld bead having a composition which closely matches the composition of the workpieces forms a strong, durable, high quality weld bead. In another embodiment, the consumable electrode is a flux coated electrode or a solid metal electrode.

In accordance with still another aspect of the present invention, the welding circuit is designed for use in a short circuit arc welder. In one embodiment, the welding circuit includes a first circuit for controlling the current flow during the short circuit condition wherein the molten metal at the end of the consumable cored electrode is primarily transferred by a transfer current into a molten metal pool by surface tension action. In one specific aspect of this embodiment, the transfer current includes a high current pinch pulse across the shorted melted metal which helps facilitate the transfer of the molten metal from the electrode to the weld pool. In still another embodiment, the welding current circuit includes a second circuit to create a melting current. In one specific aspect of this embodiment, the melting current is a high current pulse which is passed through the arc. Preferably, the high current pulse has a preselected amount of energy or wattage used to melt a relatively constant volume of metal at the end of the consumable electrode when the electrode is spaced from the welding pool. In still yet another embodiment, the second circuit of the welding current circuit provides a high energy boost during the initial portion of the arcing condition. In one specific aspect of this embodiment, the high current boost has a preselected I(t) area or energy for melting a relatively constant volume of metal on the end of the consumable wire when the wire is spaced from the welding pool. In another specific aspect of this embodiment, the energy created during the high current boost or plasma boost is sufficient to create a spherical metal ball having a diameter of no more than twice the diameter of the welding wire. In still a further embodiment, after the initial high current boost, a high current is maintained for a preselected period of time and then subsequently reduced so that the desired amount of energy or wattage is applied to the electrode to melt the desired volume of the electrode. In one specific aspect of this embodiment, the reduction of the high current is in the form of a delayed current over a period of time. In another embodiment, the welding current circuit limits the amount of energy directed to the electrode so as to prevent the unnecessary melting of the workpiece ends.

In accordance with another aspect of the present invention, the welding current circuit includes a circuit to produce a background current. In one embodiment, the background current is a low level current which is maintained just above the level necessary to sustain an arc after the termination of a short circuit condition. In another embodiment, the background current is maintained throughout the welding cycle to insure that the arc is not inadvertently extinguished during welding.

In accordance with still another aspect of the invention, the welding circuit includes a controller for shifting between polarity during the welding process. In one embodiment, the duration of the positive and negative polarity pulse during a single welding cycle is the same. In another embodiment, the duration of the positive and negative polarity pulse during a single welding cycle is different. In still another embodiment, a positive polarity pulse occurs during a single welding cycle and a negative polarity pulse occurs during anther welding cycle. In yet another embodiment, the controller is software controlled.

In accordance with yet another aspect of the present invention, an STT welder of The Lincoln Electric Company or STT short circuit welding process is used. In one embodiment, the STT process is used with a cored electrode. In another embodiment, the STT process is used with a consumable electrode and the polarity through the electrode negative. When using the electrode negative process of the STT welder, the workpiece puddle is hot and the cooling of the puddle requires time allowing the bead to be pulled back. In one aspect of the embodiment, the background current is reduced to reduce the heat in the puddle. This current correction decreases the amount of heat in the total welding process. By reversing the polarity of the STT welder to an electrode positive condition, the workpiece puddle may become too cold. To overcome this weld puddle cooling, the STT welder or process shifts between the standard electrode negative polarity to electrode positive polarity during the total welding process. In this manner the heat is controlled without changing the level of the background current. The heat of the puddle is controlled to a selected temperature by adjusting the ratio of negative electrode to positive electrode welding.

In accordance with another embodiment of the present invention, the electrode is a non-consumable electrode. In one embodiment, the non-consumable electrode includes tungsten.

In accordance with yet another aspect of the present invention, the welding circuit is designed for TIG welding. In one embodiment, the welding circuit shifts polarity during the welding process. In another embodiment, the duration of the positive polarity pulse and the negative polarity pulse during a welding cycle is the same. In yet another embodiment, the duration of the positive polarity pulse and the negative polarity pulse during a welding cycle is different. In still another embodiment, the welding circuit convents direct current into alternating current. In one specific aspect of this embodiment, the current alteration is accomplished by high speed power switches with at least one switch being conductive when at least one other switch is non-conductive, and visa-versa. In another specific aspect of this embodiment, the welding circuit includes a high reactance reactor or choke with first and second portions, and the first portion is connected across the power supply in a negative polarity direction for a heating cycle and then reversing the procedure by applying the second portion of the reactor or choke across the workpiece in the opposite direction. In still another specific aspect of this embodiment, the current alteration is accomplished by software control.

In accordance with still yet another embodiment of the present invention, the welding circuit includes boost-buck circuit to increase the voltage from the welding power supply to the electrode.

The primary object of the present invention is the provision of an arc welding system and method which forms a high quality weld bead between two metal plates.

Another object of the present invention is the provision of an arc welding system and method which includes a fuel cell to at least partially supply power to generate an arc between an electrode and the workpiece.

Still another object of the present invention is the provision of an arc welding system and method which is environmentally friendly.

Yet another object of the present invention is the provision of an arc welding system and method which reduces noise and/or air pollution during operation.

A further object of the present invention is the provision of an arc welding system and method which is portable and can be used in a wide variety of environments.

Still a further object of the present invention is the provision of an arc welding system and method which includes a direct oxidation fuel cell.

Yet a further object of the present invention is the provision of an arc welding system and method that includes a fuel cell that produces one or more product gasses that can be at least partially used as a shielding gas.

Another object of the present invention is the provision of an arc welding system and method which includes a fuel cell that uses an organic liquid feed.

Yet another object of the present invention is the provision of an arc welding system and method that includes a plurality of stacked fuel cells.

Still another object of the present invention is the provision of an arc welding system and method which accurately tracks a desired current profile during the welding of a workpiece.

Another object of the present invention is the provision of an arc welding system and method which includes a fuel cell having at least one proton conducting membrane positioned between an anode and cathode of the fuel cell.

Yet another object of the present invention is the provision of an arc welding system and method which includes a fuel cell having at least one proton conducting membrane which inhibits the migration through the membrane of the organic feed for the fuel cell.

Still yet another object of the present invention is the provision of a short circuiting arc welding system and method for applying a controlled amount of energy to the electrode to form a weld bead on the workpiece.

A further object of the present invention is the provision of an arc welding system and method which produces a weld bead having a composition which is substantially similar to the composition of the workpiece.

Yet another object of the present invention is the provision of an arc welding system and method which uses a cored electrode to form a high quality weld bead.

A further object of the invention is the provision of an arc welding system and method which changes the polarity of the weld current during a welding process.

Another object of the present invention is the provision of an arc welding system and method which controls the heat of the weld puddle by adjusting the ratio of electrode positive current to electrode negative current, either during a cycle or from one cycle to the next cycle.

Still another object of the present invention is the provision of an arc welding system and method which increases the voltage to the electrode.

These and other objects and advantages will become apparent to those skilled in the art upon reading the following description taken together with the preferred embodiment disclosed in the accompanied drawings.

BRIEF DESCRIPTION OF THE DRAWINGS

Reference may now be made to the drawings, which illustrate various preferred embodiments that the invention may take in physical form and in certain parts and arrangement of parts wherein.

DETAILED DESCRIPTION OF THE PREFERRED EMBODIMENT

Figure 1:
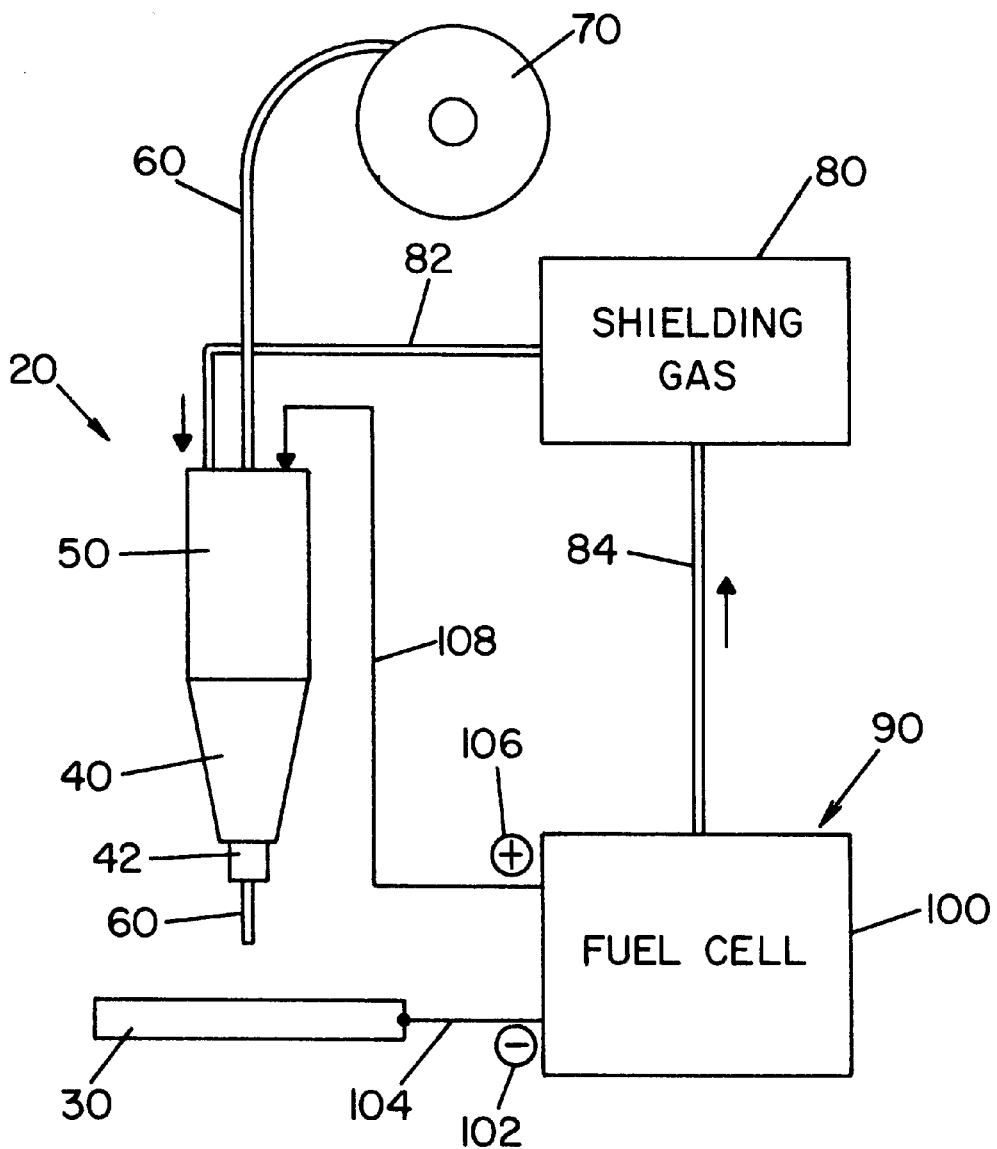
FIG. 1 provides a schematic representation of an arc welder that is powered by a fuel cell and which fuel cell supplies shielding gas to the arc welder in accordance with a preferred embodiment of the invention.

Referring now to the drawings wherein the showings are for the purpose of illustrating preferred embodiments of the invention only and not for the purpose of limiting the same, FIG. 1 illustrates an electric arc welder 20 for welding together two or more workpieces 30. The arc welder 20 includes a welding head 40 and a welding body 50. Welding head 40 includes a nozzle 42. Nozzle 42 facilitates in directing the electrode toward the workpiece. A consumable electrode 60 is unwound from wire roll 70 and is fed into welding body 50. The consumable electrode passes through welding body 50, through welding head 40 and is guided toward workpiece 30 by nozzle 42. A welding wire feeder, not shown, controls the feed rate of the electrode during the welding process. A shielding gas is supplied to welding body 50 by a gas tube 82 that is connected to a shielding gas source 80. A shielding gas controller, not shown, controls the flow rate of the shielding gas, i.e. carbon dioxide, to the workpiece during the welding process. The arc welder is powered by an electric energy source 90. As shown in FIG. 1, the electric energy source 90 is only a fuel cell 100; however, fuel cell 100 can be used in combination with a plurality of fuel cells and/or other electric energy sources to power the arc welder. The fuel cell is shown to generate a direct current as indicated by the positive and negative terminals on the fuel cell. The negative terminal 102 is connected to workpiece 30 by wire 104. The positive terminal 106 is connected to welding body 50 by wire 108. As can be appreciated, fuel cell 100 can be designed to produce an alternating current. Fuel cell 100 is shown to produce a reaction product that is directed to shielding gas source 80 by gas line 84. The production of the reaction product by fuel cell 100 will further be described below. The basic components of the arc welder, i.e. electrode, welding head, welding body, are standard components of arc welders, thus will not be further described.

The fuel cell 100 is designed to function as a partial or complete power source for arc welder 20 and to also provide the necessary shielding gas during the arc welding of workpiece 30. The fuel cell is preferably designed to be used with organic feed products which results in the production of electric energy for the arc welder and reaction products that are environmentally friendly. The organic feed is selected such that at least one of the reaction products can be used as a shielding gas source during the arc welding operation. As a result, the use of a fuel cell has the advantage of portability, environmental friendliness, reducing air and noise pollution, and allowing for the elimination of other shielding gas sources. The elimination of other shielding gas sources eliminates the cost associated with such gas and distribution limitations associated with obtaining such gas. Liquid feed fuel cell converts the chemical energy of its fuel directly into electrical current without burning the fuel. The fuel cell has many advantages over conventional power sources such as fuel for the fuel cell is a common and widely used substance, i.e. methanol (a liquid also known as methyl alcohol) which is mixed with water. Methanol is inexpensive, easily manufactured from coal or natural gas, and safe to store. Another advantage of the fuel cell is that it runs relatively cool (below the boiling point of water) and is compact. The low temperature operation eliminates the need for special high melting materials bulky thermal insulation and structural reinforcement to mitigate safety hazards. The fuel cell also does not create toxic byproducts. The methanol fuel is completely converted to carbon dioxide ($CO_2$) and water. The fuel cell is simple and relatively inexpensive to manufacture, consisting of little more than a membrane coated with platinum or other noble metals. The cell itself has no moving parts. Its precious metals are used in small amounts and can be completely recovered and recycled at the end of the device's life. The lack of moving parts makes the fuel cell quiet during operation. The fuel cell is also converting more than 34 percent of the theoretical energy content of the fuel into usable power. This is twice the efficiency of existing gasoline engines.

Figure 2:
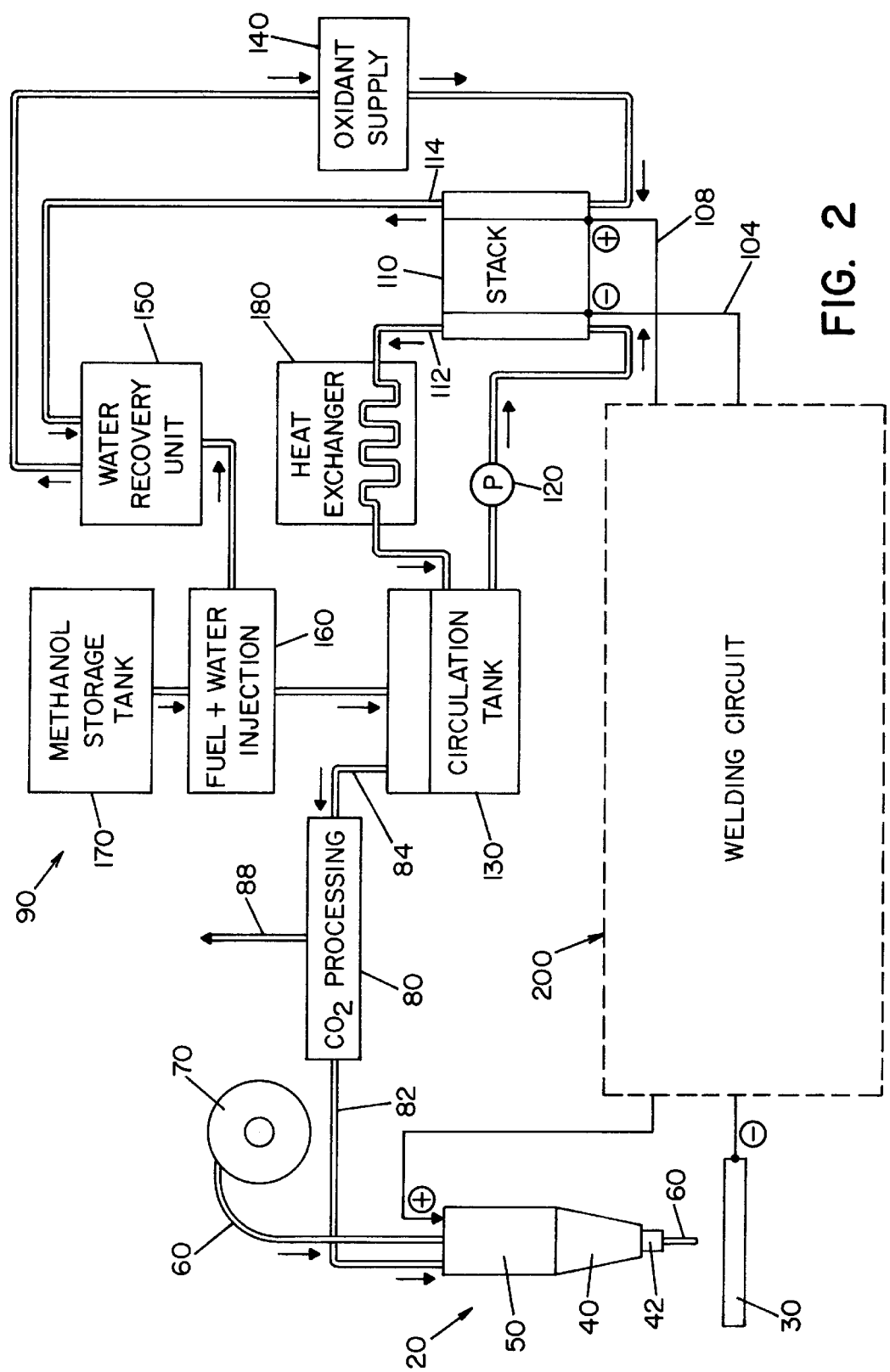
FIG. 2 provides a schematic representation of an arc welder that is powered by a multi-cell fuel system employing a plurality of liquid feed organic fuel cells and includes a welding circuit which controls the current and/or voltage to an electrode.

Referring now to FIG. 2, the operation of electric energy source 90 is shown in greater detail. Electric energy source 90 is shown to include a stack 110 of cells 100. Each cell, not shown, includes an anode, a cathode and a solid polymer proton-conducting cation-exchange electrolyte membrane. The anode, cathode and solid polymer electrolyte membrane are preferably single multi-layer composite structures, referred to herein as a membrane-electrode assembly. A detailed illustration of each fuel cell 100 is shown in U.S. Pat. No. 5,599,638, which is incorporated herein by reference. A pump 120 is provided for pumping an organic fuel and water solution into an anode chamber of the fuel cell. The organic fuel and water mixture is withdrawn through an outlet port 112 on stack 110 and is re-circulated though a circulation tank 130. Carbon dioxide formed in the anode compartment of the fuel cell is vented through a port 114. An oxidant supply 140 is provided to feed oxygen and/or air into a cathode chamber of the fuel cell. Oxygen and/or air supplied by an oxidant supply 140 may be, for example, a bottled oxygen supply, an air-blowing fan and/or an air compressor. An air and water and/or oxygen and water mixture is withdrawn from stack 110 through an outlet port 114 and conveyed to a water recovery unit 150. Water recovery unit 150 operates to separate the air and/or oxygen from the water. A portion of the air and/or oxygen separated by unit 150 is returned to oxidant supply 140 for re-entry into stack 110. Fresh air and/or oxygen is added to the returned air and/or oxygen by oxidant supply 140. Water separated by unit 150 is fed to a fuel and water injection unit 160 which also receives an organic fuel, such as methanol, from a storage tank 170. Injection unit 160 combines the water from recovery unit 150 with the organic fuel from tank 170, yielding a fuel and water solution with the fuel dissolved in the water.

The fuel and water solution provided by injection unit 160 is fed into a circulation tank 130. A fuel and water mixture containing carbon dioxide is withdrawn through port 112 from stack 110 and is fed through a heat exchanger 180 and into circulation tank 130. Hence circulation tank 130 receives both a fuel and water solution from injection unit 160 and a fuel and water solution containing a carbon dioxide gas from heat exchanger 180. Circulation tank 130 extracts carbon dioxide from the fuel and water mixture and releases the carbon dioxide through a vent 84. The resulting fuel and water solution is fed through pump 120 and into stack 110. Circulation tank 130 can also be located between stack 110 and heat exchanger 180 so as to remove the carbon dioxide before the heat exchanger and thereby improve performance of the heat exchanger. A radiator, not shown, can be used to heat the methanol/water mixture prior to feeding the mixture to the stack of fuel cells. A cold start heater, not shown, may also be used to heat the methanol/water mixture prior to starting the flow of the mixture toward the stack. A methanol sensor, not shown, can be used to sense the methanol concentration to maintain the desire concentration in the mixture. An oxygen sensor, not shown, can be used to sense the oxygen concentration to maintain the desired concentration in the fuel cell.

The operation of the various components illustrated in FIG. 2 will now be described in greater detail. Circulation tank 130 is preferably a tower having a large head space. The liquid fuel and water mixture received from injection unit 160 is added into a top of the tower. The fuel and water mixture having carbon dioxide therein is fed into a bottom portion of the tower. Carbon dioxide gas released from the fuel and water mixture is allowed to accumulate in the head space and is ultimately vented through valve 88 of $CO_2$ processing unit 80 and/or is directed through line 82 to arc welder 20. $CO_2$ processing unit 80 may contain a scrubber device, compressor, dryer and/or condenser, not shown, to purify and/or pressurize the $CO_2$ gas from circulating tank 130. Alternately, the fuel and water mixture containing the carbon dioxide can be passed through a cluster of tubes of a microporous material which allows gases to be released through walls of the tubes of the microporous material, while the liquid fuel flows along an axis of the tubes.

A static re-circulation system (not shown) can be employed within an anode chamber of stack 110 to separate carbon dioxide from the fuel and water mixture such that an external circulation tank need not be provided. With such a system, bubbles of carbon dioxide, due to innate buoyancy, tend to rise vertically within the anode chamber. Viscous interaction with the liquid fuel mixture surrounding the gas bubbles drags the liquid fuel upwards in the direction of outlet port 114. Once outside the anode chamber, the liquid releases the gas, exchanges heat with the surroundings and cools, thereby becoming denser than the liquid in the cell. The denser liquid is fed into the bottom of the anode chamber through an inlet port. Instead of expending electrical energy on the pump, the static re-circulation system takes advantage of the heat and gas produced in the cell. The aforementioned process forms the basis of the static re-circulation system which.

Prior to using the fuel cell to energize the arc welder, the anode chambers of the fuel cell stack are filled with the organic fuel and water mixture and the cathode chambers are filled with air or oxygen. During operation, the organic fuel is circulated past the anodes while oxygen or air is circulated past the cathodes. When an electrical circuit 200 is connected between the anode and cathode of the stack, electro-oxidation of the organic fuel occurs at the anodes and electro-reduction of oxygen occurs at the cathodes. The occurrence of different reactions at the anode and cathode gives rise to a voltage difference between the two electrodes. Electrons generated by electro-oxidation at the anode are conducted through the welding circuit 200 and are ultimately captured at the cathodes. Hydrogen ions or protons generated at the anodes are transported directly across the membrane to the cathodes. A flow of current is sustained by a flow of ions through the membrane and electrons through the welding circuit.

The composition of the anode, cathode and membrane of the fuel cell will now be briefly described. The anode, cathode and membrane form a composite layered structure. In a preferred implementation, the membrane is formed from a perfluorinated proton-exchange membrane material, such as a co-polymer of tetrafluoroethylene and perfluorovinylether sulfonic acid. Other membrane materials can also be used. For example, membranes of modified perflourinated sulfonic acid polymer, polyhydrocarbon sulfonic acid and composites of two or more kinds of proton exchange membranes can be used. The membrane is designed to minimize fuel cross-over during the operation of the fuel cell and to allow protons to pass through the membrane.

The anode is formed from platinum-ruthenium alloy particles either as fine metal powders, i.e. "unsupported", or dispersed on high surface area carbon, i.e. "supported". A carbon fiber sheet backing can be used to make electrical contact with the particles of the electrocatalyst. Alternately, both unsupported and supported electrocatalysts may be prepared by chemical methods, combined with a fluoride polymer binder and spread or inked on carbon paper to produce the anode. Platinum-based alloys in which a second metal is either tin, iridium, osmium, or rhenium can be used instead of platinum-ruthenium. In general, the choice of the alloy depends on the fuel to be used in the fuel cell. Platinum-ruthenium is preferable for electro-oxidation of methanol. For platinum-ruthenium, the loading of the alloy particles in the electrocatalyst layer is preferably in the range of about 0.05–4.0 $mg/cm^2$. More efficient electro-oxidation is realized at higher loading levels, rather than lower loading levels. The anode structure for the liquid feed fuel cells require anode structures that are similar to batteries. The anode structures are porous and capable of wetting the liquid fuel. In addition, the anode structures must have both electronic and ionic conductivity to effectively transport electrons to the anode current collector (carbon paper) and hydrogen/hydronium ions to the electrolyte membrane. Furthermore, the anode structure must help achieve favorable gas evolving characteristics at the anode.

The electrocatalyst layer and carbon fiber support of the anode are preferably impregnated with a hydrophilic proton-conducting polymer additive. The additive is provided within the anode, in part, to permit efficient transport of protons and hydronium produced by the electro-oxidation reaction. The ionomeric additive also promotes uniform wetting of the electrode pores by the liquid fuel/water solution and provides for better utilization of the electrocatalyst. The kinetics of methanol electro-oxidation by reduced adsorption of anions is also improved. Furthermore, the use of the ionomeric additive helps achieve favorable gas evolving characteristics for the anode. The additive should be hydrophilic, proton-conducting, electrochemically stable and should not hinder the kinetics of oxidation of liquid fuel. Hydrophilic proton-conducting additives which can be used include a copolymer of fluorocarbon polymer and fluorocarbon sulfonic acid polymer, montmorrolinite clays, zeolites, alkoxycelluloses, cyclodextrins, and/or zirconium hydrogen phosphate. A loading of 0.05 to 0.5 $mg/cm^2$ is desired. Electrode compositions with additive in excess of 10% may result in an increased internal resistance of the fuel cell and poor bonding with the solid polymer electrolyte membrane. Compositions with less than 2% of the additive do not typically result in improved electrode performance.

The cathode is a gas diffusion electrode in which platinum particles are bonded to one side of the membrane. The cathode is preferably formed from unsupported or supported platinum bonded to a side of the membrane opposite to the anode. As with the anode, the cathode metal particles are preferably mounted on a carbon backing material. The loading of the electrocatalyst particles onto the carbon backing is preferably in the range of about 0.5–4.0 $mg/cm^2$. The electrocatalyst alloy and the carbon fiber backing preferably contains a fluoride polymer to provide hydrophobicity needed to create a three-phase boundary and to achieve efficient removal of water produced by electro-reduction of oxygen.

During operation, a fuel and water mixture (preferably containing no acidic or alkaline electrolyte) in the concentration range of about 0.5–3.0 mole/liter is circulated past the anode. Preferably, flow rates in the range of 10–500 milliliters/min. are used. As the fuel and water mixture circulates past the anode, the following electrochemical reaction, for a methanol cell, occurs releasing electrons:

Anode: 

Carbon dioxide produced by the above reaction is withdrawn along with the fuel and water solution through outlet 114 and separated from the solution in a gas-liquid separator 150. The fuel and water solution is then re-circulated into the cell by pump 120.

Simultaneous with the electrochemical reaction at the anode, another electrochemical reaction involving the electro-reduction of oxygen, which captures electrons, occurs at the cathode.

Cathode: $O_2 + 4H^+ + 4e^{31} \rightarrow H_2O$.

The individual electrode reactions described by equations 1 and 2 result in an overall reaction for the exemplary methanol fuel cell given by:

Fuel Cell: $2CH_3OH + 3O_2 \rightarrow 2CO_2 + 4H_2)$.

At sufficiently high concentrations of fuel, current densities greater than 500 mA/cm can be sustained. Lower flow rates of the methanol feed have been found to be preferably at lower current densities. High flow rates of the methanol feed are preferable while operating at high current densities to increase the rate of mass transport of organic fuel to the anode as well as to remove the carbon dioxide produced by electrochemical reaction.

Preferably, oxygen or air is circulated past the cathode at pressures in the range of 0 to 30 psig. Pressures greater than ambient can improve the mass transport of oxygen to the sites of electrochemical reactions, especially at high current densities. Water produced by electrochemical reaction at the cathode is transported from the cathode by flow of oxygen through port 114.

The thickness of the proton-conducting solid polymer electrolyte membrane should be in the range from 0.05–0.5 mm to be dimensionally stable. Membranes thinner than 0.05 mm may result in membrane electrode assemblies which are poor in mechanical strength, while membranes thicker than 0.5 mm may suffer extreme and damaging dimensional changes induced by swelling of the polymer by the liquid fuel and water solutions and also exhibit excessive resistance. The ionic conductivity of the membranes should be greater than 1 ohm$^{-1}$ cm$^{-1}$ for the fuel cell to have a tolerable internal resistance. As noted above, the membrane should have a low permeability to the liquid fuel. Membranes of polyethylene and polypropylene sulfonic acid, polystyrene sulfonic acid and other polyhydrocarbon-based sulfonic acids can also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water contents, or differing types and extent of cross-linking (such as cross linked by multivalent cations e.g., Al 3+, Mg 2+etc.,) can be used to achieve low fuel permeability. Such composite membranes can be fabricated to achieve high ionic conductivity, low permeability for the liquid fuel and good electrochemical stability.

As can be appreciated for the foregoing description, a liquid feed direct oxidation organic fuel cell is achieved using a proton-conducting solid polymer membrane as electrolyte preferably without the need for a free soluble acid or base electrolyte. The primary or only electrolyte is the proton-conducting solid polymer membrane. Since no free acid is present, acid-induced corrosion of cell components, which can occur in current-art acid based organic/air fuel cells, is avoided. This offers considerable flexibility in the choice of materials for the fuel cell and the associated subsystems. Furthermore, unlike fuel cells which contain potassium hydroxide as liquid electrolyte, cell performance does not degrade because soluble carbonates are not formed. Also by the use of a solid electrolyte membrane, parasitic shunt currents are avoided.

Figure 3:
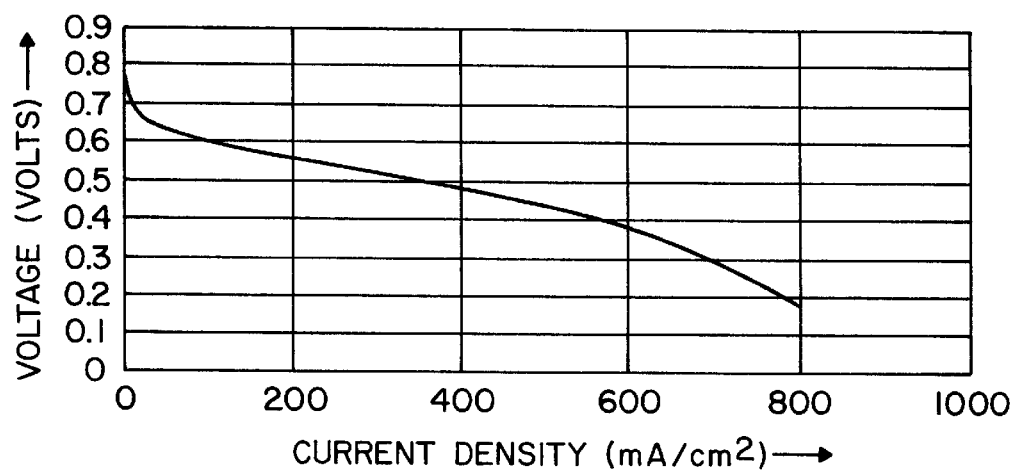
FIG. 3 is a graph illustrating the performance in volts verses current density of the liquid feed fuel cell of FIG. 1.
Figure 4:
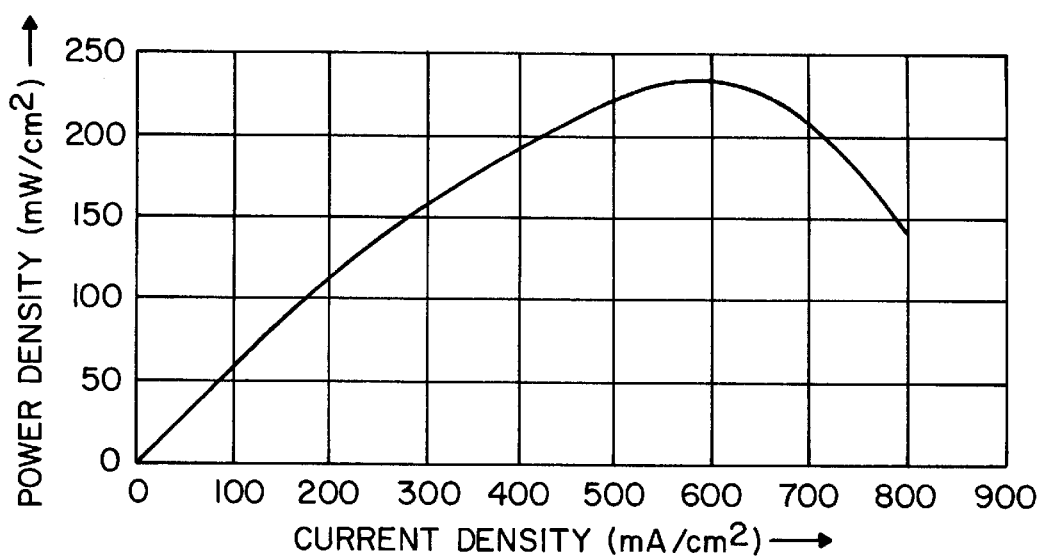
FIG. 4 is a graph illustrating the performance in power density verses current density of the liquid feed fuel cell of FIG. 1.
Figure 5:
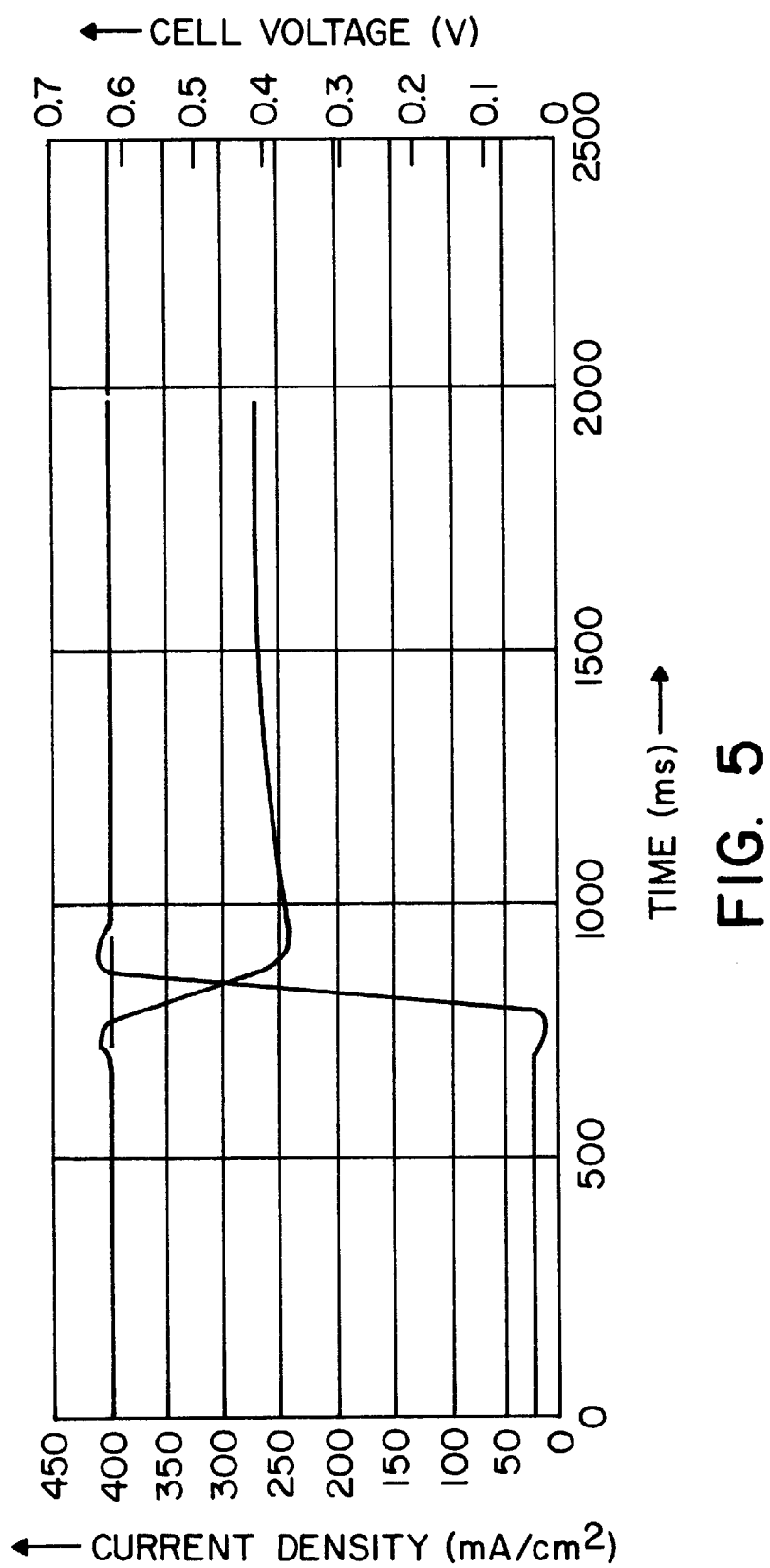
FIG. 5 is a graph illustrating the load handling characteristics and transient response time of the liquid feed fuel cell of FIG. 1.

FIG. 3 illustrates the fuel cell performance by plotting fuel cell potential against current density in mA/cm$^2$. FIG. 3 illustrates the performance of a fuel cell fed in one molar methanol solution at 90° C. and an air mixture pressurized at 20 psig. The graft illustrates that about 0.48 V at about 400 m A/cm$^2$ can be sustained by the fuel cell. The optimization of the fuel cell involves a balance between the current density and efficiency of the cell. FIG. 4 shows the power density as a function of current density. The optimum operation point achieves a power density of about 230 m W/cm$^2$. The optimum operating point occurs within a range of current density between 400 and 700 mA/cm$^2$. The cell voltage over this range is between 0.48 and 0.31 volts. Referring now to FIG. 5, the transient response of the fuel cell is illustrated. The transient response of the fuel cell is shown to be about 500–800 ms. This short transient response is suitable for use in arc welders and therefore large energy storage elements are not required.

A well recognized welding load curve is represented by the equation V=15+0.05I. When the voltage on a single cell is about 0.44 volts, to achieve a voltage sufficient for welding, a number of individual fuel cells must be connected in series. Due to losses in the power conversion circuitry, cable losses, and transient demands of the welding load, a few volts of margin are anticipated. The margin is based on design experience of typical welding conditions and may be more or less depending on actual circumstances. The cross-section al area of the cell is determined by the desired load current and the operating current density of the cell.

Figure 6:
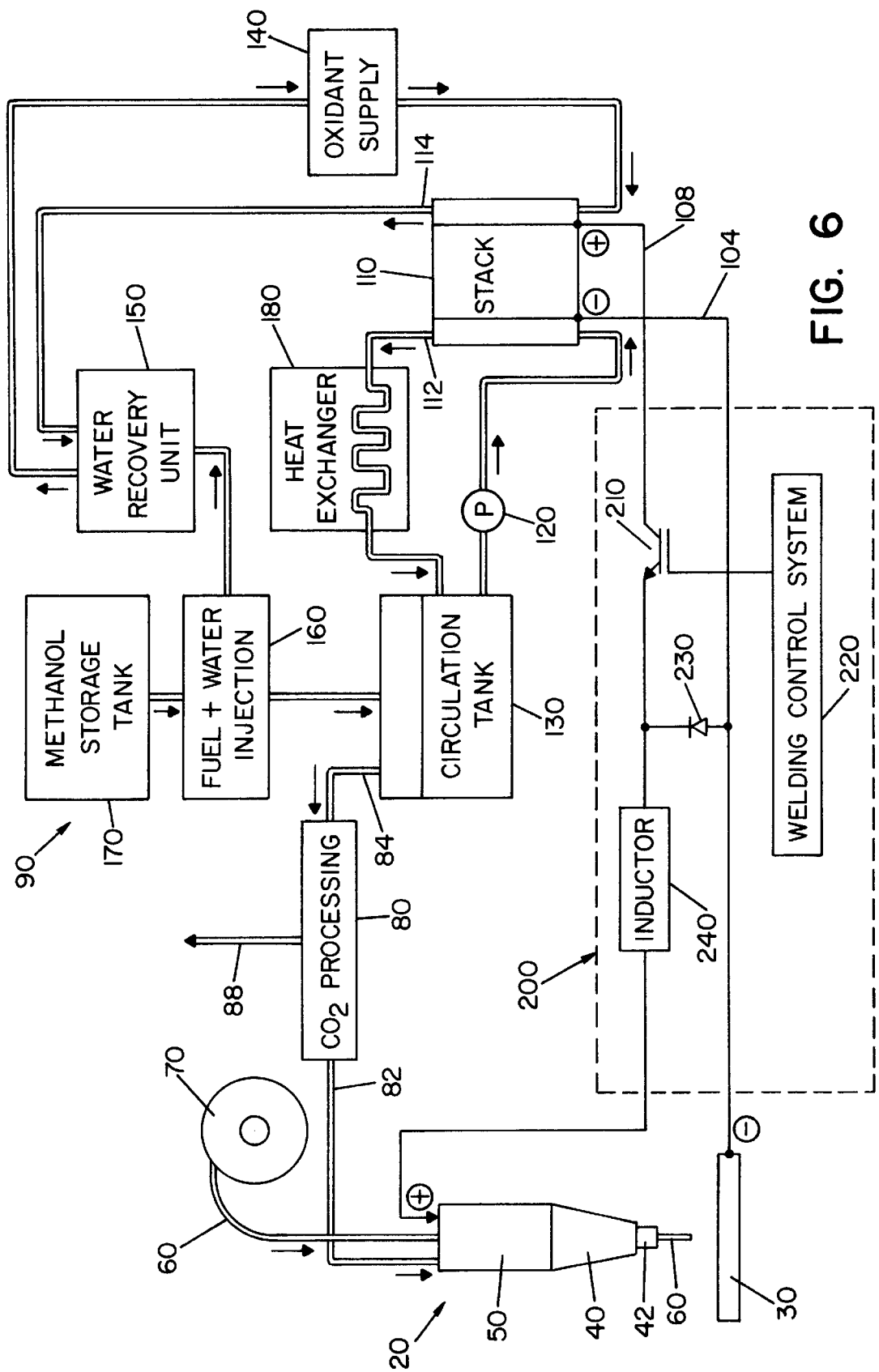
FIG. 6 provides a schematic representation of an arc welder as shown in FIG. 2, wherein the welding circuit is shown to include a welding controller and a bulk power convertor.

Referring now to FIG. 6, a welding circuit including a buck power converter is shown. The table below shows data for the stack configuration when a buck converter is employed, assuming typical welding loads and operating conditions. For the purpose of calculating the stack configuration of the fuel cells, the following operational data is assumed for the fuel cell operating point: 220 mW/cm$^2$ and 500 mA/cm$^2$ (0.44 volts).

STACK CONFIGURATION—BUCK POWER CONVERTER STAGE

| Welding Current (A) | Welding Current (V) | Load Power (kW) | Voltage Margin (V) | Total Voltage (V) | Number of Cells in Stack | Cross Sectional Area of Cells (cm$^2$) |
|---|---|---|---|---|---|---|
| 0 | 15.0 | 0.0 | 13 | 28 | 63 | 0 |
| 100 | 20.0 | 2.0 | 14 | 34 | 77 | 113 |
| 150 | 22.5 | 3.4 | 14.5 | 37 | 84 | 175 |
| 300 | 30.0 | 9.0 | 16 | 46 | 104 | 376 |
| 300 | 30.0 | 9.0 | 16 | 46 | 104 | 376 |
| 400 | 35.0 | 14.0 | 17 | 52 | 118 | 516 |
| 500 | 40.0 | 20.0 | 18 | 58 | 131 | 664 |

The positive terminal of the stacks 110 are located on the side where oxidant is supplied and is connected to the input of the power conversion circuit 200. The negative connection is on the side where the fuel is supplied and is connected to one terminal of the workpiece 30. Welding circuit 200 is used to regulate the welding current preferably in response to a feedback signal proportional to welding voltage, welding current or both. Reversing the connections to the welding electrode and workpiece will reverse the welding load current. A DC negative electrode configuration is often $CO_2$ welding processes.

FIG. 6 shows the collection of the $CO_2$ is shown at the appropriate point in the fuel cell system diagram. The stack 110 produces an abundant amount of $CO_2$ for welding. The CO₂ may contain trace amounts of water or methanol vapor that must be removed before feeding the gas to the welding arc. A gas dryer may be needed to assure that the gas is free of contaminating vapors. The fuel cell is typically operated at pressures exceeding ambient pressure, thus compression of the $CO_2$ is generally not necessary. However, if the operating pressure of the cell is too low, the $CO_2$ gas may be compressed before being routed to the welding arc. The flow rate for weld shielding gas must be regulated to an appropriate level to avoid excess arc disturbance. Since the fuel cell can produce more $CO_2$ than is needed to shield the arc, a flow regulator may be needed to provide only the appropriate amount of shielding gas. The remainder of the $CO_2$ is vented or used for other purposes.

FIG. 6 shows the electrical connections for a DC positive electrode configuration. Power conversion circuitry is used to modulate the current output from the fuel cell into the welding load. FIG. 6 shows a buck converter (chopper) for this purpose. The welding circuit 200 includes a transistor 210 which is controlled by a welding control system 220. The welding control system controls the wave shape of the current to the welder. The welding control system may rely on feedback control during the operation of the arc welder. The welding circuit also includes a diode 230 to maintain the proper flow of current through the electrode. The welding circuit also includes an inductor 240 to smooth the current wave form to through the electrode. The stack voltage should always exceed the transient load requirements for a buck converter to be effective.

Figure 7:
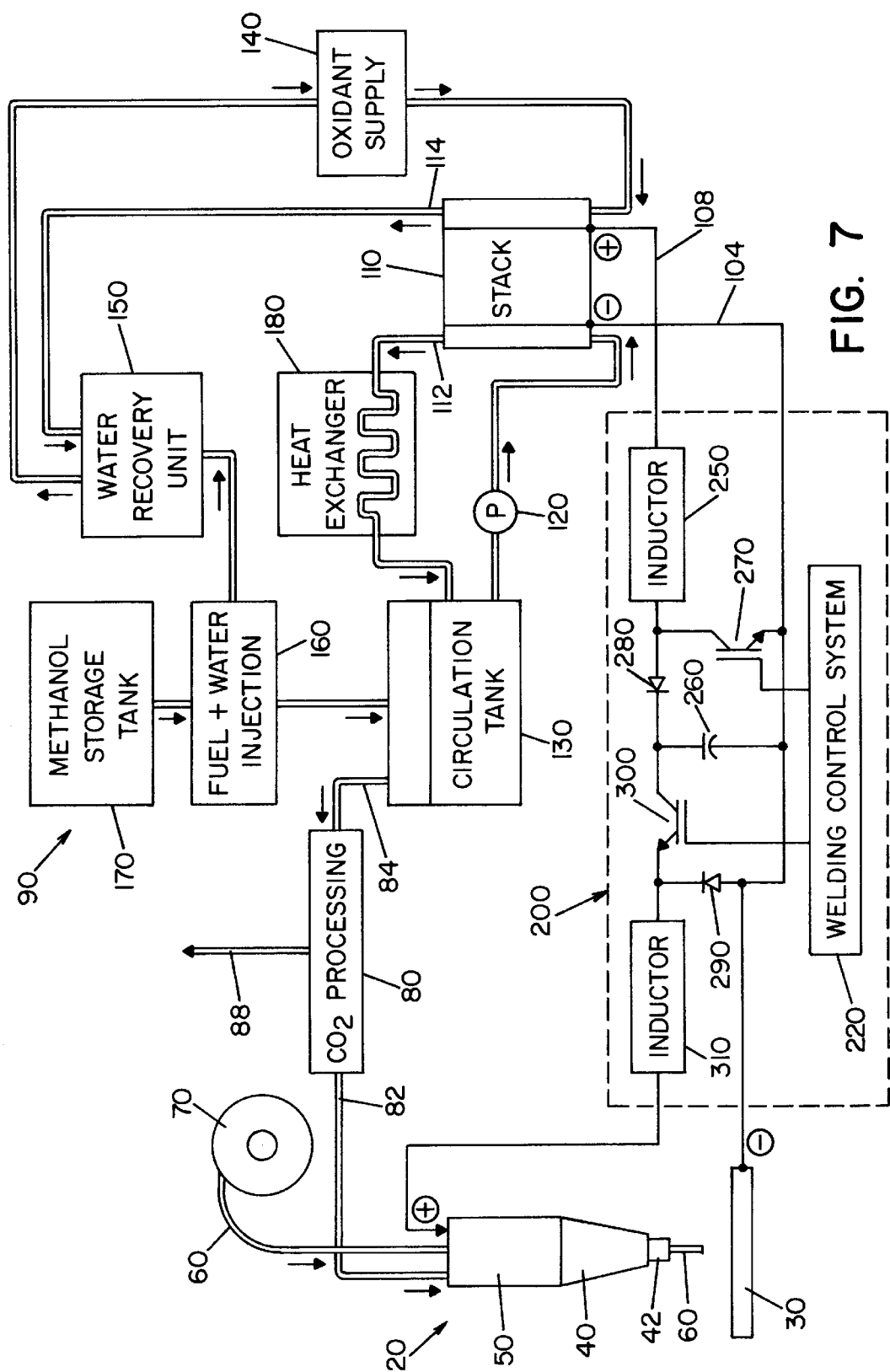
FIG. 7 provides a schematic representation of an arc welder as shown in FIG. 2, wherein the welding circuit is shown to include a welding controller and a boost-bulk power convertor.
Figure 8:
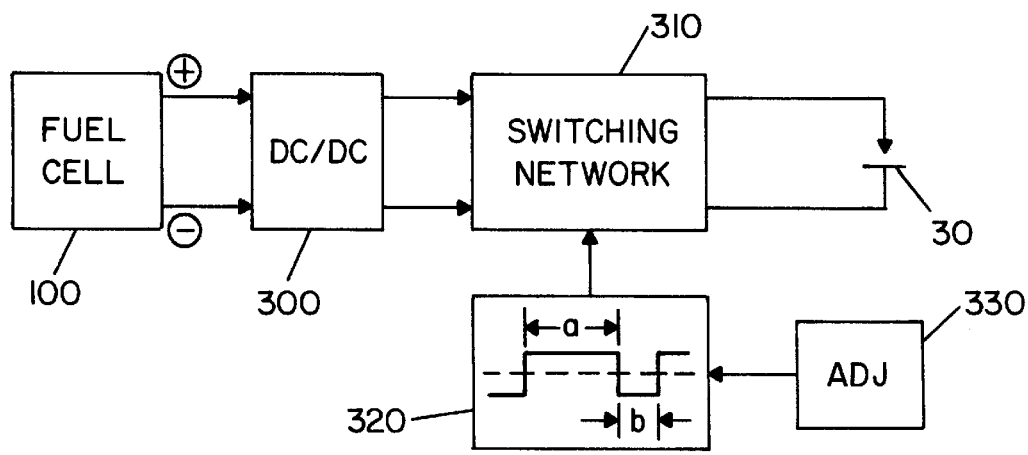
FIGS. 8–10 are alternate embodiments of simplified circuit diagrams which illustrate the welding circuit of FIG. 1 controlling the wave shape of the current through the electrode of the arc welder.
Figure 9:
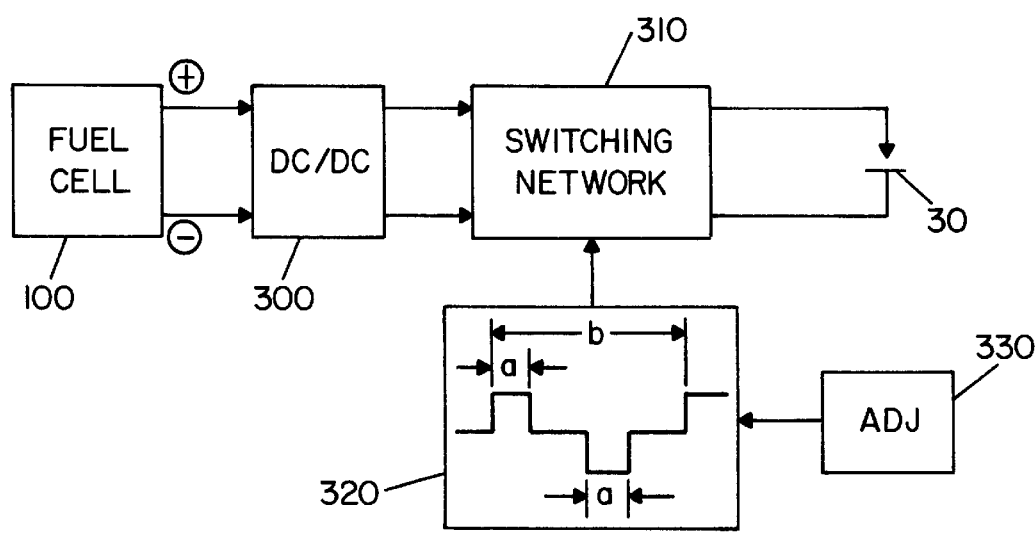

Other DC to DC converter circuits may be used. A boost-buck converter topology is shown in FIG. 7. The boost-buck circuit in welding circuit 200 is designed to increase the voltage to the electrode without having to increase the number of fuel cells in stack 110. Welding circuit 200 includes a welding control system 220 which is similar to the control system in FIG. 6. Welding circuit also includes inductor 250, a capacitor 260 and transitor 270 which is controlled by welding control system 220 to boost the voltage through the welding circuit. The diodes 280, 290, transitor 300, and inductor 310 function similar to the chopper or buck circuit in FIG. 6 is beneficial to reduce the number of cells in the stack because this topology can regulate load voltage to levels above or below the fuel cell voltage. This feature provides much more latitude in the design of the stack as illustrated in the table below:

Referring now to FIGS. 8 and 9, a schematic representation of control circuits are shown for use with a TIG welder. In welding aluminum, and similar metals, TIG welding is used wherein a con-consumable electrode, such as a tungsten electrode, is spaced from the workpiece a distance sufficient to establish an arc when current flow is created by a voltage across the spacing. Since aluminum oxidizes quite easily, it is necessary to remove aluminum oxide from the welding surface as filler wire is melted by the heat of the arc and deposited onto the aluminum workpiece. The metal is cleaned by using an alternating current power supply for directing an alternating current through the gap or spacing between the electrode and workpiece. In accordance with this practice, during the positive cycle, the electrode is positive with respect to the workpiece; therefore, electrons are emitted from the workpiece. This process disintegrates and removes aluminum oxide from the surface preparatory to the immediately following negative cycle wherein the tungsten or other nonconsumable electrode is negative with respect to the workpiece. Electrons are emitted from the tungsten electrode in the direction of the workpiece for the purpose of relatively efficient heating in the arc area. By employing alternating current through the arc, alternate primarily cleaning cycles and heating cycles are created to provide a fairly efficient TIG welding procedure for aluminum.

When direct current power supplied are used for TIG welding, the operator must select the polarity to be used. If mild steel or stainless steel is to be welded, it need not be cleaned therefore, direct current electrode negative TIG welding can be used. This polarity provides no arc cleaning action to remove oxide film; therefore, if used for welding aluminum, pre-weld cleaning and oxide removal of the welding surface must be accomplished before welding. This is practical only when heavy aluminum plate is TIG welded and the additional precleaning requirement is outweighed by the increased welding speed using electrode negative polarity. In view of this, the operator often selects direct current electrode positive TIG welding wherein the current flows from the electrode to the workpiece. This causes a cleaning action in combination with the arc welding procedure.

FIGS. 8 and 9 illustrate a direct current fuel cell 100 which supplies electric current to a DC/DC circuit 300. The DC/DC circuit is typically a buck or a boost-buck circuit. However, other types of DC/DC circuits can be used. The modified DC current is then directed to a switching network 310. The switching network converts the direct current into an alternating current for use in a TIG welder. A wave profile

STACK CONFIGURATION—BUCK POWER CONVERTER STAGE

| Numbers of Cells in Stack = | | | 35 | 45 | 60 | 75 | 100 | 125 |
|---|---|---|---|---|---|---|---|---|
| Stack Voltage = | | | 15.4 | 19.8 | 26.4 | 33.0 | 44.0 | 55.0 |

| Welding Current (A) | Welding Voltage (V) | Load Power (kW) | Cross Sectional Area of Cells (cm²) | Cross Sectional Area of Cells (cm²) | Cross Sectional Area of Cells (cm²) | Cross Sectional Area of Cells (cm²) | Cross Sectional Area of Cells (cm²) | Cross Sectional Area of Cells (cm²) |
|---|---|---|---|---|---|---|---|---|
| 0 | 15.0 | 0.0 | 0 | 0 | 0 | 0 | 0 | 0 |
| 100 | 20.0 | 2.0 | 248 | 193 | 145 | 116 | 87 | 70 |
| 150 | 22.5 | 3.4 | 419 | 326 | 245 | 196 | 147 | 117 |
| 200 | 25.0 | 5.0 | 621 | 483 | 362 | 290 | 217 | 174 |
| 300 | 30.0 | 9.0 | 1118 | 870 | 652 | 522 | 391 | 313 |
| 400 | 35.0 | 14.0 | 1739 | 1353 | 1014 | 812 | 609 | 487 |
| 500 | 40.0 | 20.0 | 2484 | 1932 | 1449 | 1159 | 870 | 696 |

Figure 11:
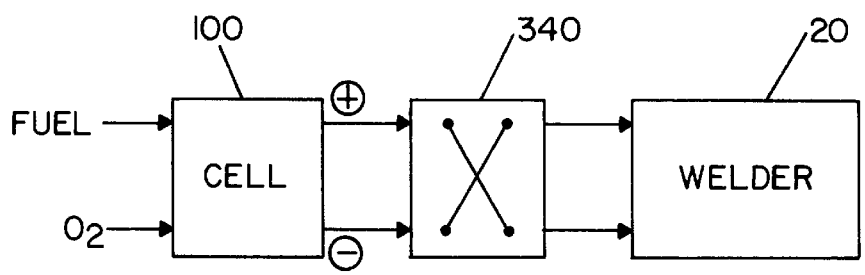
FIG. 11 is still another alternate embodiment of a simplified circuit diagram illustrating a polarity invertor which is included in the welding circuit of FIG. 1.

320 controls switches in the switching network to control the duration of the positive and negative pulse during the welding cycle. As shown in FIG. 8, the duration (a) of the positive pulse is longer than the duration (b) of the negative pulse. A pulse width adjuster 330 adjusts the pulse duration of the positive and/or negative pulse. As shown in FIG. 9, the pulse duration (a) of the positive and negative pulse are about the same during welding cycle (b). FIG. 11 illustrates a polarity reversal circuit 340 which reverses the direct current from fuel cell 100 to arc welder 20. The switching of the polarity can be by software control.

The welding circuit has the ability to convert a standard direct current fuel cell to an alternating current power source for use in a TIG welder. This welding operation can also be used with consumable electrode welding. The consumable electrode is melted and deposited upon the workpiece by globular transfer, short circuiting transfer, pulse current transfer, etc. In any of these systems of metal transfer, it may be advantageous to shift from a positive current to a negative current for purposes of increasing the electrode melt-off rate or for other reasons. The welding circuit can be employed for providing a momentary current polarity reversal for use in welding, as well as for TIG welding.

The welding circuit produces the advantages of a normal alternating current, TIG welder with the additional capacity to adjust the relative amount of heating and cleaning of the workpiece for a given period. The welding circuit can control the ratio of positive and negative power to control the extent of the cleaning action created during the positive current flow.

The welding circuit can also be used to reduce arc blow. This distortion of the arc which is caused by magnetic field interaction with the arc plasma, is normally associated with welding consumable electrodes at high DC current levels. The welding circuit can reduce the effects of arc blow by momentarily reversing the arc current.

Figure 10:
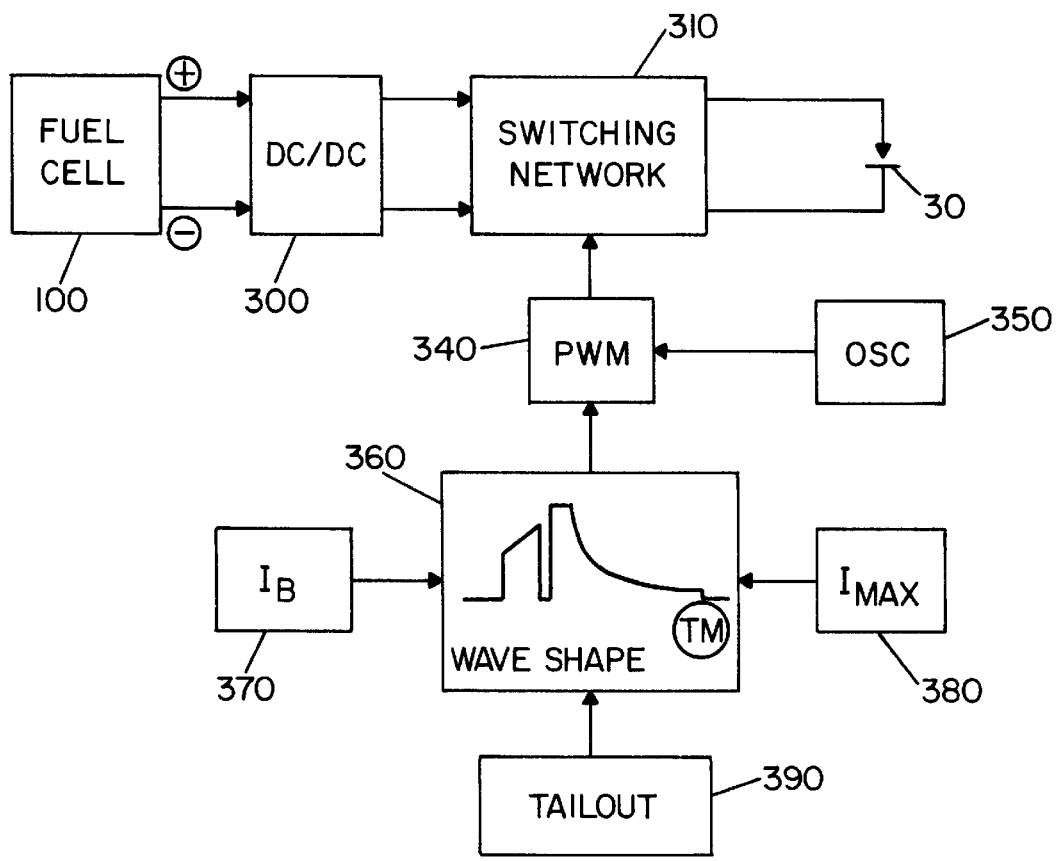

Referring now to FIG. 10, the fuel cell 100 is shown to provide power to a STT type welder. The direct current from the fuel cell supplies current to a DC/DC circuit 300. The DC/DC circuit can be the same type of circuit as described in FIGS. 8 and 9. The current from the DC/DC circuit proceeds to the switching network 310. The switching network forms the desired wave shape of the current to workpiece 30. Controlling the switching network is a pulse width modulator (PWM) 340 which is regulated by oscillator (OSC) 350. The desired wave shape of the current to the workpiece is set by the STT wave shape profile 360. A background current setting 370 and a maximum current setting 380 are used to modify the wave shape profile. A decaying current at the end of the wave shape is controlled by tailout setting 390. The welding circuit can adjust the polarity of the wave shape during a single welding cycle or during different welding cycles by using the polarity reversing circuit of FIG. 11.

The specific welding circuit and control arrangement for an STT type of welding is disclosed in United States Letters Patent Nos. 4,972,064; 5,148,001; and 5,961,836, which patents are incorporated herein. In general, the stack of fuel cells produce a DC current which is converted into a pulse by a modulator. The shapes of the pulse are controlled by a shaping circuit to thereby create a desired current wave shape. The DC current is directed across a welding area which includes a consumable cored electrode and workpiece.

In the STT process, the electrode alternates between a short circuit condition when the electrode engages the workpiece and an arcing condition where the electrode is spaced from the workpiece. During the arcing condition, an electric arc is created between the workpiece and the electrode for purposes of melting and maintaining molten the end of the electrode as it is fed toward workpiece for a subsequent short circuit condition. The welding cycle alternates between a short circuit condition and a plasma condition.

During the plasma condition, it is necessary that an arc is created and maintained at all times for the purpose of smooth and effective welding. The welding cycle which is repeated several times per second must be accurately controlled for the purpose of reducing spatter at various times during the welding cycle. The pulse width modulator operates at a high frequency. The operating frequency of the pulse width modulator controller is about 10–30 kHz with a width of the successive current pulse being determined by the voltage from the wave shape controller. Since the highest rate of the welding cycle is generally in the neighborhood of 100 to 400 cycles per second, many update pulses are provided during each welding cycle.

The welding circuit directs current to work area in accordance with the operation of the pulse width modulator controller until the dr/dt (where r is the electrode resistance), di/dt or dv/dt indicates an upcoming fuse during the pinch cycle. When this detection occurs, the current flow caused by the welding circuit between the electrode and the workpiece is immediately dropped to a low level.

The background current circuit continues to provide five to seven amps of current across the workpiece irrespective of the operating condition of the welding circuit. As a result, the background current insures that at least five to seven amps of current pass between the electrode and the workpiece at all times during the welding cycle, thereby preventing the extinguishment of the arc between the electrode and the workpiece during any phase of the welding cycle.

The electrode 60 is preferably a consumable cored electrode which includes an outer metal sheath and an electrode core. As can be appreciated, the electrode could alternatively be a coated electrode or solid wire electrode. Preferably the metal electrode sheath is made up of carbon steel, stainless steel or some other type of metal or metal alloy. Preferably the composition of the metal sheath is selected to be similar to the base metal component of the workpiece. The electrode core preferably includes fluxing agents and/or alloy and metals. Fluxing agents may include compounds to create a slag over the weld bead to protect the weld bead until it solidifies, to retain the weld bead in position until it solidifies and/or to shield the weld metal during the formation of the weld bead. The flux may also include components which produce a shielding gas to protect the root bead from the adverse effects of the environment. The alloying agents are also preferably included in the electrode core. The alloying agents are preferably selected such that the alloying agents in combination with the composition of the metal electrode sheath form a weld bead having a composition substantially similar to the metal composition of the workpiece.

FIG. 10 shows a desired current profile to produce low spatter during welding. This current profile is divided into a pinch portion, a plasma boost portion, a plasma portion and a background portion wherein the arc is to be maintained. The plasma boost portion, which is critical to the operation of the spatter control system, is the constant current portion prior to the decay portion; however, the decaying portion can be referred to as the end of the plasma boost portion or the start of the plasma portion. Following the decaying portion, the current control circuit shifts to the background current level which maintains the plasma or arc.

The current control circuit, in accordance with the present invention, maintains a preselected background current level, thereby preventing the current level through the arc from ever falling below the preselected current low current level and allowing the arc to extinguish.

The current control circuit is designed to produce all the melting of the electrode during the plasma boost and plasma portion of the welding cycle. Further melting of electrode does not take place when the background current level occurs since the IR necessary for melting the electrode is not obtainable through an arc maintained only by the background current. Thus, the background current only serves to maintain the arc and the ball of molten metal in the molten state. The amount of molten metal at the end of electrode which is formed by the plasma boost and plasma is selected to melt a preselected volume of molten metal at the end of the electrode, and the plasma portion of the current is reduced to the background current once the preselected volume is obtained. The duration of the plasma boost and plasma portion can also be selected. During the formation of the molten metal ball at the end of the electrode during the plasma portion of the current, the jet forces of the high current repel the melted metal from the welding pool until the preselected amount of molten metal has been melted at the end of the electrode. Once the current is reduced, the molten metal is allowed to form into a ball and the molten metal pool is allowed to stabilize, thereby allowing for a smooth contact between the substantially spherical ball and the quelled weld metal pool. The desired amount of molten metal at the end of the electrode is controlled by directing a preselected amount of energy or wattage into the electrode during the plasma portion of the welding cycle. All during the time the molten metal ball is being formed at the end of the electrode, the molten ball is shielded by a shielding gas from the atmosphere. The shield gases continue until the molten ball is transferred into the molten metal.

Once the molten metal ball is formed during the plasma boost and the plasma portion of the welding cycle, the molten ball is forced into the molten pool by feeding the electrode into the pool, thereby forming a short circuit condition. When the melted metal ball engages the molten metal pool, it is transferred into the pool by surface tension. This action causes an ultimate necking down of the molten metal extending between the pool and the wire in the electrode, and then a rupture and separation of the ball from the wire occurs. Since there is only a low background current during the separation, little if any spatter occurs. Preferably, the current control circuit monitors the necking of the molten metal ball such that when the neck rapidly reduces in diameter by electric pits, the current flow during the pinch curve increases more gradually until a detection of an impending fuse is obtained. Once the detection of an impending fuse occurs, the current is reduced to the background current until the molten metal at the end of the electrode transfers into the weld pool.

The current during the weld cycle can be all positive, all negative, or a combination of positive and negative pulses. For alternating polarity profiles, the number of positive polarity current cycles and negative polarity current cycles are controlled to obtain the desired heat in the molten metal puddle of the welding operation. If the puddle is too cold, the number of negative polarity cycles 320 is increased with respect to the number of positive current cycles. The desired ratio is obtained by appropriate selector circuit in the welding controller.

An alternative control concept can be used wherein each welding cycle is initiated as a standard negative polarity cycle and is then shifted to a positive polarity cycle at a preselected point in the cycle. In accordance with this aspect of the invention, the polarity of the rapidly created current pulses is shifted after the termination of plasma boost portion. Thus, the tailout portion is divided into a negative portion and a positive portion with an instantaneous shift in polarity. Thereafter, the current cycle is a positive polarity until the end of the cycle. In this manner, the heat of the weld puddle is determined by the selection of the time delay for reversing the polarity of weld cycle. Other modifications could be made to alternate between a positive polarity and a negative polarity for the current pulses from the STT welder for controlling the heat of the welding operation.

The invention has been described with reference to a preferred embodiment and alternates thereof. It is believed that many modifications and alterations of the embodiment disclosed will readily suggest themselves to those skilled in the art upon reading and understanding the detailed description of the invention. It is intended to include all such modifications and alterations in so far as they come within the scope of the present invention.

What is claimed is:

1. An electric arc welding apparatus for forming a welding bead on a workpiece comprising an electric energy source, a welding circuit, an electrode and a shielding gas source, said electric energy source including a plurality of fuel cells that provide sufficient voltage and current to said welding circuit to cause an electric arc to form between said electrode and said workpiece, said fuel cell including an anode, a cathode, at least one solid polymer proton conductor membrane positioned between the anode and cathode, an organic liquid feed, and a mechanism to pass the organic feed past said anode, said shielding gas at least partially from a gas reaction product of said fuel cell.

2. The apparatus as defined in claim 1, wherein said fuel cell is selected from the group consisting of an indirect fuel cell, a direct fuel cell and combinations thereof.

3. The apparatus as defined in claim 2, wherein said fuel cell is a direct fuel cell.

4. The apparatus as defined in claim 1, wherein said organic feed includes a feed selected from a group consisting of methanol, formaldehyde, formic acid, dimethoxymethane, trimethoxymethane, trioxane and combinations thereof.

5. The apparatus as defined in claim 1, wherein said gas reaction product includes a gas selected from the group consisting carbon monoxide, carbon dioxide and combinations thereof.

6. The apparatus as defined in claim 1, wherein said anode includes a metal selected from the group consisting of platinum-ruthenium alloy, platinum-tin, platinum-iridium, platinum-osmium, platinum-rhenium, and mixtures thereof.

7. The apparatus as defined in claim 1, wherein said solid polymer proton conductor membrane includes a material selected from the group consisting of co-polymer of tetrafluoroethylene and perflourinated sulfonic acid, perflourinated sulfonic acid polymer, polyhydrocarbon sulfonic acid, and mixtures thereof.

8. The apparatus as defined in claim 1, wherein said solid polymer proton conductor membrane includes a catalyst, said catalyst including a material selected from the group consisting of Ir, Mo, Nb, Nu, Os, Pd, Pt, Re, Ru, $RuO_2$, Sn, $SnO_2$, Ti, W, $WO_3$, Zr, and combinations thereof.

9. The apparatus as defined in claim 1, including at least two solid polymer proton conductor membranes, one of said solid polymer proton conductor membranes having a different composition from another of said solid polymer proton conductor membranes.

10. The apparatus as defined in claim 1, wherein said cathode includes platinum.

11. The apparatus as defined in claim 1, wherein said welding circuit at least partially controls at least one welding parameter between said electrode and said workpiece, said welding parameter includes a parameter selected from the group consisting of voltage, current, energy, power, polarity and combinations thereof.

12. The apparatus as defined in claim 11, wherein said welding circuit includes a welding current circuit that supplies current to said electrode, said welding current circuit including a first circuit to create a transfer current and a second circuit to create a melting current, said second circuit supplying a sufficient amount of current to said electrode to form said weld bead on said workpiece.

13. The apparatus as defined in claim 12, wherein said second circuit directing a preselected amount of energy to said welding wire to melt a relatively constant volume of said electrode during each welding cycle.

14. The apparatus as defined in claim 12, wherein said second circuit reducing the amount of current to said electrode prior to molten metal on said electrode forming a short circuit with said workpiece.

15. The apparatus as defined in claim 14, wherein said second circuit creating a decaying current profile when said current is reduced.

16. The apparatus as defined in claim 12, wherein said first circuit directing a high current pulse at the end of a short circuit condition between said electrode and said workpiece and applying said pulse until just prior to a predicted termination of the short circuit condition.

17. The apparatus as defined in claim 12, wherein said first circuit reducing the amount of current to said welding wire prior to said molten metal on said electrode forming a short circuit condition with workpiece.

18. The apparatus as defined in claim 1, wherein said welding circuit boosts the voltage of said electric energy source.

19. The apparatus as defined in claim 1, wherein said welding circuit including a background current circuit which directs a background current though said electrode.

20. The apparatus as defined in claim 1, wherein said electrode is a consumable flux cored metal electrode.

21. An apparatus as defined in claim 20, wherein said flux cored electrode includes alloying components in the core to form a weld bead having a substantially similar composition as the composition of said workpiece.

22. The apparatus as defined in claim 1, wherein said welding circuit including a current polarity controller to control the polarity of at least a portion the current passing through said electrode.

23. The apparatus as defined in claim 22, wherein said welding circuit creates a series of small width current pulses constituting a welding cycle with a short circuit transfer portion and a plasma arc melting portion, said current pulses in said cycle each having a given electrical polarity, said polarity controller selecting the polarity of said pulses in said cycle between a first polarity being positive and a second polarity being negative.

24. The apparatus as defined in claim 22, wherein said polarity controller includes a decoder with a first condition for selecting one of said first or second polarity for a first number of consecutive welding cycles and a second condition for selecting the other of said polarity for a second number of consecutive cycles and a mechanism to alternate between said first and second conditions during a welding operation.

25. The apparatus as defined in claim 24, wherein said cycles each have a desired arc current and including a shunt to sense the actual arc current and an error amplifier to compare said actual arc current with said desired arc current to control the width of said current pulses.

26. The apparatus as defined in claim 22, wherein said polarity controller maintaining a positive polarity during at least a portion of said current passing through said electrode.

27. The apparatus as defined in claim 22, wherein said polarity controller maintaining a negative polarity during at least a portion of said current passing through said electrode.

28. The apparatus as defined in claim 22, wherein said polarity controller maintaining said current in a positive polarity for a first duration of time and maintaining the current in a negative polarity for a second duration of time.

29. The apparatus as defined in claim 28, wherein the time period of the sum of said first and second duration substantially the same during each welding cycle.

30. The apparatus as defined in claims 28, wherein said first duration greater than said second duration.

31. The apparatus as defined in claim 22, wherein said welding circuit includes a center tapped inductor with a first portion creating said first polarity and a second portion creating said second polarity, a first switch for connecting said first portion of said inductor between said electrode and said workpiece, a second switch for connecting said second portion of said inductor between said electrode and said workpiece, and a selector to close either said first switch or said second switch during a given weld cycle.

32. A method of electric arc welding to form a weld bead on a workpiece, said method comprising:
  a) providing a metal electrode;
  b) providing an electric energy source which produces a current, said electric energy source including a fuel cell, said fuel cell forms a gas product which can at least partially be used as a shielding gas;
  c) providing a welding circuit;
  d) supplying said current to said welding circuit to form an arc between said electrode and said workpiece; and,
  e) at least partially directing said gas product to said workpiece during the formation of said weld bead.

33. The method as defined in claim 32, wherein said welding circuit at least partially controlling the wave shape of said current to said electrode.

34. The method as defined in claim 32, wherein said electrode is a consumable flux cored metal electrode.

35. The method as defined in claim 32, wherein said welding circuit forming an electric wave to said electrode comprising a short circuit transfer portion and a controlled melting portion.

36. The method as defined in claim 35, wherein said controlled melting portion selected from the group consisting of applying a preselected amount of energy to the electrode or applying a preselected amount of power to said electrode.

37. The method as defined in claim 32, wherein welding circuit forming a background current, said background current having a high inductance component and a low level just above the level necessary to sustain an arc between said electrode and said workpiece throughout each welding cycle.

38. The method as defined in claim 32, wherein said welding circuit controls the polarity of the electric wave to said electrode.

39. The method as defined in claim 38, wherein said electric wave includes a series of small width current pulses each having a given electrical polarity.

40. The method as defined in claim 39, wherein the polarity of said electric wave is shifted between a first polarity and a second polarity during the welding cycle.

41. The method as defined in claim 38, wherein polarity of said electric wave is alternated as a function of the cumulative amount of energy applied to said electrode and said workpiece in one polarity and the cumulative amount of energy applied to said electrode and said workpiece in the other polarity.

42. The method as defined in claim 32, wherein said welding circuit boosts the voltage of said electric energy source.

43. The method as defined in claim 32, wherein said fuel cell is selected from the group consisting of an indirect fuel cell, a direct fuel cell and combinations thereof.

44. The method as defined in claim 32, wherein said fuel cell includes an organic feed.

45. The method as defined in claim 44, wherein said organic feed includes a feed selected from a group consisting of methanol, formaldehyde, formic acid, dimethoxymethane, trimethoxymethane, trioxane and combinations thereof.

46. The method as defined in claim 32, wherein said fuel cell includes a liquid feed.

47. The method as defined in claim 32, wherein said fuel cell includes an anode, a cathode and at least one solid polymer proton conductor membrane positioned between the anode and the cathode.

48. The method as defined in claim 32, wherein said fuel cell includes a plurality of stacked fuel cells.

* * * * *